No. 613,430. Patented Nov. 1, 1898.
M. H. SPRINGSTEEN.
PHOTOGRAPHIC VIEW FINDER.
(Application filed July 2, 1898.)
(No Model.)
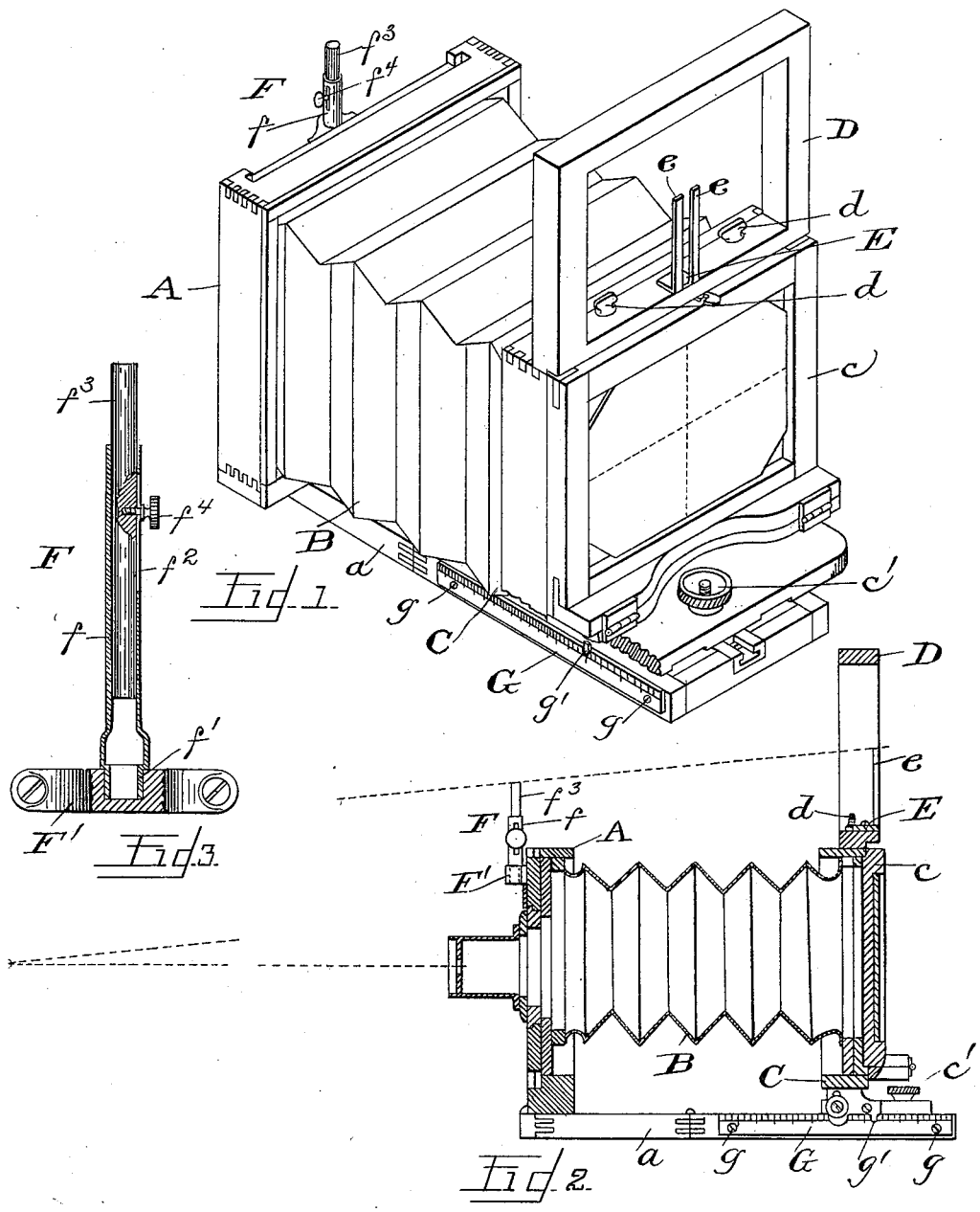

UNITED STATES PATENT OFFICE.

MYRON H. SPRINGSTEEN, OF FRANKFORT, MICHIGAN, ASSIGNOR OF ONE-HALF TO N. AUGUSTUS PARKER, OF SAME PLACE.

PHOTOGRAPHIC VIEW-FINDER.

SPECIFICATION forming part of Letters Patent No. 613,430, dated November 1, 1898.

Application filed July 2, 1898. Serial No. 685,035. (No model.)

*To all whom it may concern:*

Be it known that I, MYRON H. SPRINGSTEEN, a citizen of the United States, residing at Frankfort, in the county of Benzie and State of Michigan, have invented certain new and useful Improvements in View-Finders for Photographic Cameras; and I do hereby declare the following to be a full, clear, and exact description of the invention, such as will enable others skilled in the art to which it appertains to make and use the same.

My invention is a view-finder for photographic cameras; and it consists in the novel features hereinafter described, reference being had to the accompanying drawings, which illustrate one form in which I have contemplated embodying my invention, and said invention is fully disclosed in the following description and claims.

Referring to the said drawings, Figure 1 represents a perspective view of a camera having my view-finder applied thereto. Fig. 2 is a vertical longitudinal sectional view of the same. Fig. 3 is a detail view of the adjustable sighting-post and its support.

The object of my invention is to provide an apparatus which can be attached to an ordinary view-camera for the purpose of giving the operator correct information of the field or picture projected upon the ground glass or sensitive plate without resorting to the act of focusing for each exposure.

In the drawings, A represents the front frame of a camera; B, the bellows; C, the rear frame, carrying the hinged frame $c$, provided with a ground-glass focusing-screen, said rear frame being adjustable with respect to the front frame and in this instance sliding on a bed $a$, attached to the front frame. The rear frame can be secured in position, when desired, by means of a clamp-nut $c'$ or set-screw, as usual. The front frame A is provided with a lens-tube $a'$, having a lens and diaphragm of any preferred construction. The camera itself forms no part of my invention, and my invention can be applied to other styles of cameras.

D represents the sighting-frame, which is of exactly the size internally as the picture to be projected upon the ground-glass screen. It is customary to make the said screen of the same size as the sensitive plate to be exposed in the camera, so that the frame D will have its internal dimensions correspond with those of the sensitive plate. This frame D is provided, preferably, with two or more attaching-screws $d$ $d$, having winged or milled heads by means of which the frame can be secured to the rear frame C of the camera, and said frame should be so located as to be substantially in the vertical plane of the ground-glass screen.

E represents a slotted sight, preferably formed of metal, secured to the lower cross-bar of the frame and forming two vertical arms $e$ $e$, extending perpendicularly thereto and of such a height that a point midway between their upper extremities will be exactly in the center of the frame D.

F represents the vertically-adjustable sighting-post, which consists, preferably, of a lower cylindrical or tubular part $f$, having a shouldered portion $f'$ at its lower end and a vertical slot $f^2$ in its walls, and a pin or post $f^3$, mounted in said tubular part and provided with a set-screw $f^4$, extending through the slot $f^2$, by means of which the post can be secured rigidly in its adjusted positions.

F' represents a socket adapted to be secured to the front frame of the camera and provided with a recess to receive the shouldered portion $f'$ of the tubular portion of the adjustable post. The socket F' will be secured to the front frame at such a point that it will be substantially above the center of the lens. I do not limit myself to the exact construction of this adjustable post, as it may be formed in other ways, if desired.

G represents a scale which is provided with indications by means of which the camera can be focused without observing the image on the ground glass, said scale being secured to the bed of the camera in this instance by screws $g$ $g$. The movable frame of the camera (in this instance the rear frame) is preferably provided with a pointer $g'$, which travels over the scale and coöperates therewith in enabling the camera to be focused for objects at different distances from the camera. This scale must of course be marked in accordance with the focal distances of the particular lens which is being used with the camera.

In adjusting my view-finder to the camera with which it is to be used the camera is placed upon a tripod or other support and carefully focused upon an object at a known distance from the lens—for example, one hundred feet—so as to bring the object in the exact center of the ground-glass screen, which is provided with cross lines or wires, as indicated in dotted lines in Fig. 1. The operator will then, without moving the camera-sight from the upper ends of the arms *e e* of the slotted sight E, adjust the vertically-adjustable sighting-post F until the top of said post appears between the upper ends of the arms *e e*, exactly even with the same and in line with the object upon which the camera is focused. The operator will then move his eye back a distance from the frame D, keeping it in line with the top of post F and arms *e e* until he sees within the frame D exactly the same field or picture that is upon the ground glass below. This distance, which I will term for convenience the "working" distance, can be found by experiment, and the operator will thereafter in using the device readily place himself at such distance from the frame D. In practice this can be done with sufficient accuracy for all practical purposes. If the camera be now removed from the tripod and held in the hand while the operator sights in the manner indicated by means of the view-finder at any object one hundred feet from the lens, he will see within the frame D the exact picture (not reversed) which will appear inverted upon the ground-glass screen or sensitive plate, and by this means the camera can be used as a hand or detective camera, if desired, or it may be used upon a tripod and the view determined without the trouble of focusing it. For distances greater or less than a hundred feet it will be only necessary to adjust the movable frame to bring the pointer to the figure on the scale indicating the required distance, when the device can be sighted and the view found, as before described.

What I claim, and desire to secure by Letters Patent, is—

1. A view-finder comprising among its members, a frame, of the size and shape internally of the plate to be exposed, adapted to be secured to the rear frame of a camera above the ground-glass screen, a sight for determining the center of said frame, and a vertically-adjustable post adapted to be secured to the front frame of the camera, substantially over the lens, substantially as described.

2. A view-finder comprising among its members a frame of the size and shape internally of the plate to be exposed, devices for detachably securing said frame to the rear frame of a camera above and substantially in the plane of the ground-glass screen, a sight for determining the center of said frame, and a vertically-adjustable post and means for detachably securing said post to the front frame of the camera above the lens, substantially as described.

3. A view-finder comprising among its members, a rectangular frame of the size and shape of the plate to be exposed, provided with the attaching-screws for securing it detachably to the rear frame of a camera, a sight secured to said frame and provided with parallel, vertically-extending arms, a point centrally between the ends of said arms being the center of the frame, and the vertically-adjustable post adapted to be secured to the front frame of the camera, substantially as described.

4. A view-finder comprising among its members, a rectangular frame of the size and shape of the plate to be exposed, provided with the attaching-screws for securing it detachably to the rear frame of a camera, a sight secured to said frame and provided with parallel, vertically-extending arms, a point centrally between the ends of said arms being the center of the frame, the bracket adapted to be detachably connected to the front frame of the camera, and the vertically-adjustable post consisting of a tubular portion adapted to be inserted in said socket, a pin or post in said tubular portion and the adjusting device for said pin or post, substantially as described.

5. The combination with a camera having a movable frame and a focusing-scale therefor, of a view-finder comprising the frame of the same size internally as the plate to be exposed, secured to the rear frame of the camera, a sight on said frame for determining the center of said frame-opening, and a vertically-adjustable post secured to the front frame of the camera, substantially as described.

In testimony whereof I affix my signature in the presence of two witnesses.

MYRON H. SPRINGSTEEN.

Witnesses:
CHARLES S. COLLIER,
JOHN B. COLLINS.